(12) United States Patent
Melaragni et al.

(10) Patent No.: US 6,633,576 B1
(45) Date of Patent: Oct. 14, 2003

(54) APPARATUS AND METHOD FOR INTERLEAVED PACKET STORAGE

(76) Inventors: William Melaragni, 30 Russet Rd., Billerica, MA (US) 01821; Geoffrey B. Ladwig, 28 Muriel Dr., Chelmsford, MA (US) 01824; Richard L. Angle, 54 Fiske Rd., Wellesley, MA (US) 02481

( * ) Notice: Subject to any disclaimer, the term of this patent is extended or adjusted under 35 U.S.C. 154(b) by 0 days.

(21) Appl. No.: 09/434,159

(22) Filed: Nov. 4, 1999

(51) Int. Cl.[7] .............................................. H04L 12/28
(52) U.S. Cl. ........................... 370/412; 711/5; 370/414
(58) Field of Search ................................ 370/412, 413, 370/414, 415, 416, 417, 418, 419, 429; 711/1, 2, 5, 100, 154, 157, 158; 710/39, 40, 52, 58

(56) References Cited

U.S. PATENT DOCUMENTS

| | | | |
|---|---|---|---|
| 5,729,709 A | * | 3/1998 | Harness ........................ 711/5 |
| 5,737,761 A | | 4/1998 | Holland et al. |
| 5,790,545 A | | 8/1998 | Holt et al. |
| 5,870,350 A | | 2/1999 | Bertin et al. |
| 5,890,219 A | * | 3/1999 | Scaringella ................. 711/162 |
| 6,405,273 B1 | * | 6/2002 | Fleck .......................... 710/131 |
| 6,427,196 B1 | * | 7/2002 | Adiletta ...................... 711/158 |

* cited by examiner

*Primary Examiner*—Douglas Olms
*Assistant Examiner*—Ricardo M. Pizarro
(74) *Attorney, Agent, or Firm*—Fish & Richardson P.C.

(57) ABSTRACT

An apparatus and method for storage of memory packets with a high aggregate bandwidth is disclosed. An odd-even memory bank structure effectively doubles the memory available for packet storage. A packet memory arbitration scheme aligns access of devices reading and writing into packet memory allowing full-rate access to the packet memory.

27 Claims, 5 Drawing Sheets

APPARATUS AND METHOD FOR INTERLEAVED PACKET STORAGE

The present invention relates generally to network devices with memory to store network packets.

BACKGROUND OF THE INVENTION

The function of a router is to receive, process, store and forward datagrams or packets to the appropriate destinations. In Asynchronous Transfer Mode (ATM) or cell-based routers all datagrams are the same length defined by a constant cellsize. Traditional routing devices often store a packet before forwarding it to its destination. In order to store the packets at the rate in which they arrive, the memory subsystem must be capable of writing a packet and any added overhead into memory before the next packet arrives. Often, the overhead data is a constant size and is approximately the same size as the smallest packet. For smaller packets the memory subsystem must run at a rate much higher than line rate since the packet plus its overhead must be written into memory in the same amount of time that it takes to receive the packet. Different interfaces have different line rates, that is, the rate at which datagrams are received by an interface card. Often interface cards have difficulty in keeping up with the rate of reception and processing of network packets.

SUMMARY OF THE INVENTION

Various implementations of the invention may include one or more of the following features.

It is advantageous to provide a high-speed memory architecture with a high bandwidth that can handle packets coming in at line rate.

In one aspect, the invention features an apparatus for storing network packets, including a latency sensitive packet handler for receiving network packets, a packet memory structure including a first memory bank and a second memory bank to store network packets, a latency insensitive packet processor connected to the first and second memory banks, and a memory controller connected to the first and second memory banks and to the packet handler, said memory controller including an arbitration agent which delays the packet processor from accessing one of the first and second memory banks when the packet processor is in a conflict for the same one of the first and second banks with the packet handler.

In an implementation, the arbitration agent does not delay the packet processor from accessing one of the first and second memory banks when the packet processor is not in conflict for the same one of the first and second banks with the packet handler.

In another implementation, the first and second memory banks are dual ported memories.

In another implementation, one of the first and second memory banks receives even memory addresses, and the other of the first and second memory banks receives odd memory addresses.

Another implementation further includes a second latency sensitive packet handler for writing out processed packets, wherein the second packet manager can be a direct memory access device.

In another implementation, the arbitration agent delays the packet processor from accessing the memory banks to when the packet processor is in a conflict for the same one of the first and second banks with the second packet handler.

In yet another implementation, the arbitration agent does not delay the packet processor from accessing one of the first and second memory banks when the packet processor is not in conflict for the same one of the first and second banks with the packet handler.

In another implementation, the packet processor is a multi-threaded microcontroller.

In still another implementation, a storage device for storing packets for processing by the packet processor is included, wherein the storage device can be a FIFO.

In another aspect, the invention features an apparatus for storing packets in memory for processing and routing, including means for receiving a plurality of packets having a first descriptor, means for preparing the packets for processing and routing, means for writing individual of the plurality of packets alternately into a first memory structure, and a second memory structure, means for alternately reading individual packets from the first memory structure and the second memory structure, means for processing the plurality of packets for routing, means for writing individual of the plurality of packets alternately into the first memory structure, and the second memory structure, means for alternately reading individual packets from the first memory structure and the second memory structure and means for routing the plurality of packets to a plurality of destinations.

In an implementation, the means for receiving a plurality of packets comprises a packet over SONET framer.

In another implementation, the means for preparing the packets for processing and routing includes means for classifying the packets and means for creating a second descriptor.

In yet another implementation, the means for processing the packets for routing includes means for creating a second descriptor having information relating to a plurality of destinations for the plurality of packets.

In still another implementation, the means for routing the plurality of packets to a plurality of destinations includes means for transferring the plurality of packets to a fabric ingress chip.

In another aspect, the invention features a method for storing packets in memory for processing and routing, including receiving a plurality of packets having a first descriptor, preparing the packets for processing and routing, writing individual of the plurality of packets alternately into a first memory structure, and a second memory structure, alternately reading individual packets from the first memory structure and the second memory structure, processing the plurality of packets for routing, writing individual of the plurality of packets alternately into the first memory structure, and the second memory structure, alternately reading individual packets from the first memory structure and the second memory structure, and routing the plurality of packets to a plurality of destinations.

In an implementation, receiving a plurality of packets comprises using a packet over SONET framer.

In another implementation, preparing the packets for processing and routing comprises classifying the packets and creating a second descriptor.

In another implementation processing the packets for routing comprises creating a second descriptor having information relating to a plurality of destinations for the plurality of packets.

In yet another implementation, routing the plurality of packets to a plurality of destinations comprises transferring the plurality of packets to a fabric ingress chip.

In another aspect, the invention features a method for arbitrating reads of packets into memory, including providing a memory system having a first packet handler, a packet processor, a second packet handler, a packet memory connected to the first and second packet handlers and to the packet processor, and a memory controller connected to the packet memory and to the first and second packet handlers, performing a plurality of reads with the packet processor from a plurality of memory locations in the packet memory, performing a plurality of reads with the second packet manager from the plurality of packet memory locations in the packet memory, and delaying any one of the plurality of reads performed by the packet processor when the any one of the plurality reads performed by the packet processor is to a common memory location of any one of the plurality of reads performed by the second packet manager.

In another implementation, the method further includes completing the reads by the packet processor after delaying the reads.

In yet another aspect, the invention features a method for arbitrating writes of packets into memory, including providing a memory system having a first packet handler, a packet processor, a second packet handler, a packet memory connected to the first and second packet handlers and to the packet processor, and a memory controller connected to the packet memory and to the first and second packet handlers, performing a plurality of writes using the packet processor to a plurality of memory locations in the packet memory, performing a plurality of writes using the first package handler into the plurality of packet memory locations in the packet memory, and delaying any one of the plurality of writes performed by the packet processor when the any one of the plurality of writes performed by the packet processor is to a common memory location of any one of the plurality of writes performed by the first packet handler.

In another implementation, the method further includes completing the any one of the plurality of writes by the packet processor after delaying any one of the plurality of writes.

In still another aspect, the invention features a method for arbitrating reads and writes of packets into memory, including providing a memory system having a first packet handler, a packet processor, a second packet handler, a packet memory connected to the first and second packet handlers and to the packet processor, and a memory controller connected to the packet memory and to the first and second packet handlers, performing a plurality of writes using the packet processor to a first plurality of memory locations in the packet memory, performing a plurality of reads using the packet processor from a second plurality of memory locations in the packet memory, performing a plurality of writes using the first packet handler into the first plurality of packet memory locations in the packet memory, performing a plurality of reads using the second packet handler from the second plurality of packet memory locations in the packet memory, delaying any one of the plurality of writes performed by the packet processor when the any one of the plurality of writes performed by the packet processor is to a common memory location of any one of the plurality of writes performed by the first packet handler, delaying any one of the plurality of reads performed by the packet processor when one of the reads performed by the packet processor is to a common memory location of the reads performed by the second packet handler, completing the writes by the packet processor after delaying any one of the writes and completing the reads by the packet processor after delaying the reads.

The invention may provide one or more of the following advantages.

The invention provides a memory architecture which allows the use of standard low-speed memory architectures for storage of memory packets with a high aggregate bandwidth. Using this architecture with dual-ported memories can achieve a high aggregate bandwidth, e.g., in excess of 8 Gbps. By setting up an odd-even memory bank structure access to packet memory is effectively doubled as compared to single-bank memory architectures.

The systems and techniques described here can enable a network user to receive data packets faster than conventional architectures, sort and store the packets in a memory architecture using readily available memory devices, and route the packets to their ultimate destinations.

The details of one or more embodiments are set forth in the accompanying drawings and the descriptions below. Other features, objects, and advantages of the invention will be apparent from the description and drawings, and from the claims.

DETAILED DESCRIPTION

Figure 1:
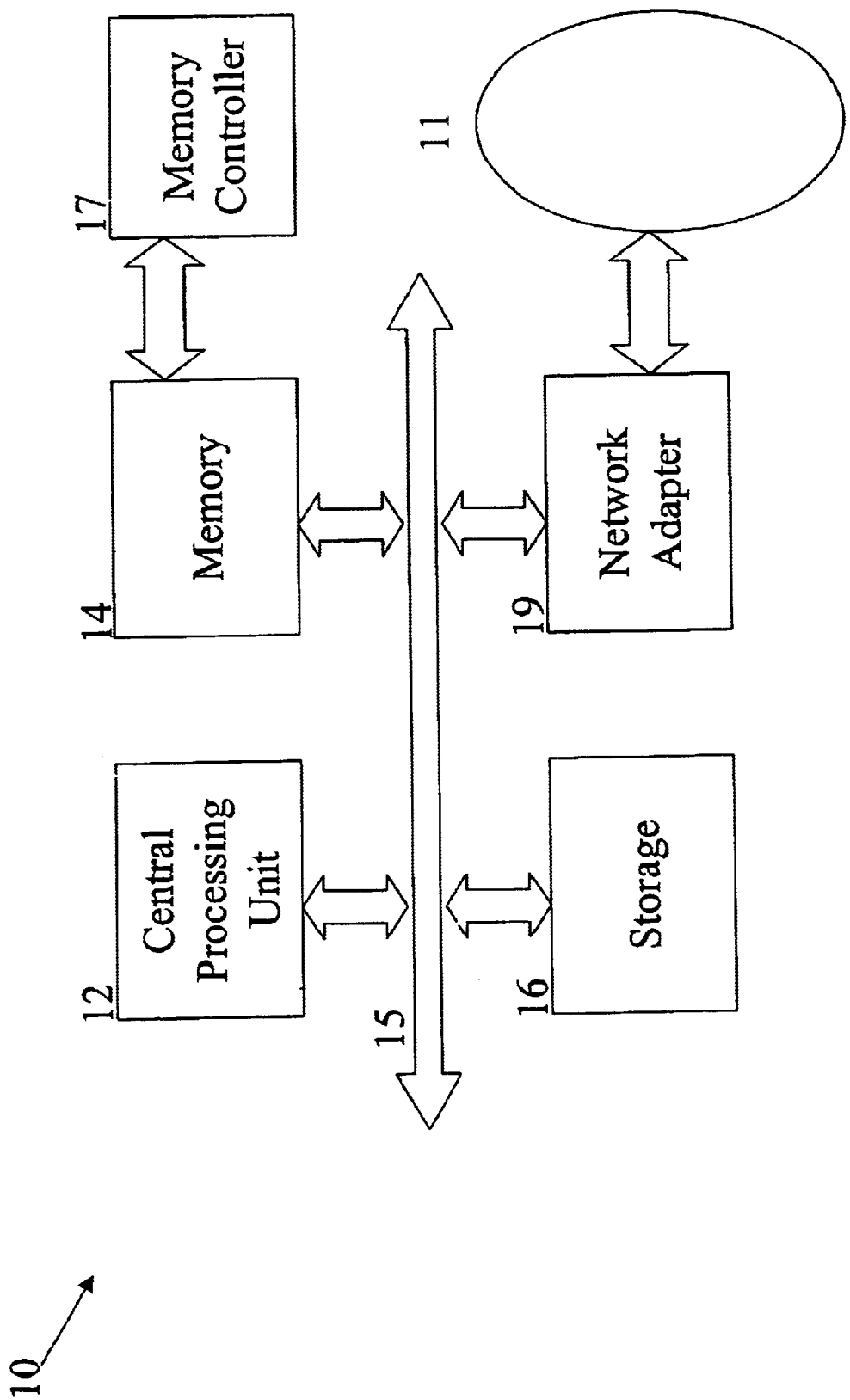
FIG. 1 illustrates a computer system.

Referring to FIG. 1, a computer system 10 includes a central processor 12 connected to a memory 14 and storage 16 via a bus 15. The processor 12 may be any conventional general purpose or special purpose processor. The storage 16 may be any storage device such as a hard disk, magneto-optical drive, and any suitable storage medium.

The system 10 generally includes a memory controller 17 as well as, various interfaces, drivers and sub-systems as shown. The system 10 also includes a network adapter 19 that interfaces the computer system 10 to a network 11 and is responsible for storing network packets and processing network packets. The network adapter 19 can be a router, bridge or any other system having a software-configured processor.

Figure 2:
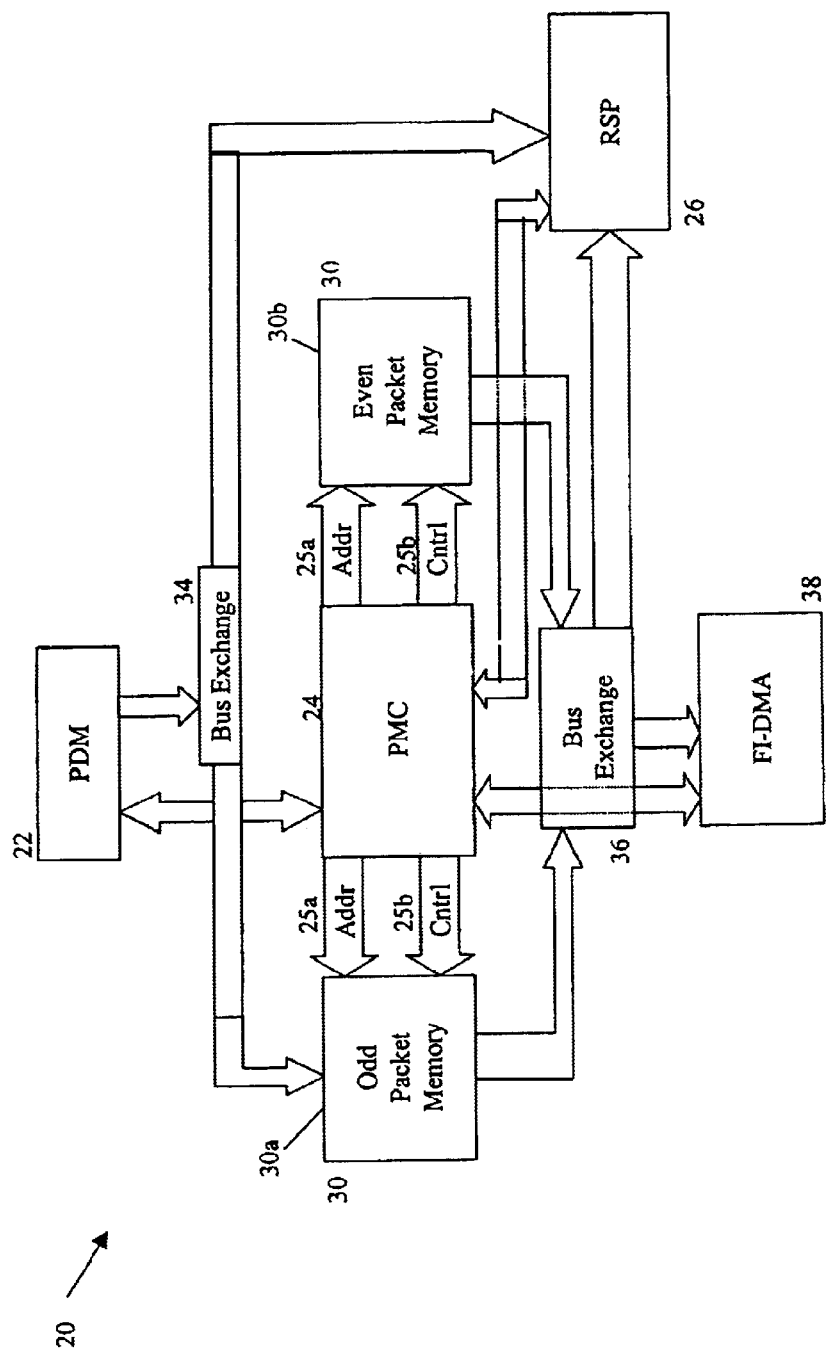
FIG. 2 illustrates a system level block diagram of an implementation of an interleaved packet memory system.

Referring to FIG. 2, an implementation of an interleaved packet memory system ("system") 20 is shown. The system 20 may be implemented in a variety of network devices requiring the storage of data packets. For example, in one implementation, the system may be used in a packet-only data router in which datagrams of arbitrary byte lengths or commands are received and processed.

The system 20 receives data packets through standard packet-over-SONET (POS) framer chips (not shown). The received data is in Point-to-Point Protocol (PPP) format. The framer chip receives the packets and extracts from the packet a payload that is passed to a packet handler called a Packet Data Manager (PDM) 22. The PDM 22 converts PPP format data into a format suitable for processing. As a PPP data frame arrives, the PDM 22 classifies the frame, tags the packet, and moves the data to a location in packet memory 30, as will be described below. The PDM 22 uses a Packet Memory Controller 24 (described below) in order to generate control and address instructions for the packets.

A Router Switch Processor (RSP) 26 controls the processing of incoming packets converted by the PDM 22. The RSP 26 prepares packets for routing to their ultimate destination. The RSP 26 generates address locations for the packets. The RSP 26 is a multi-threaded microcontroller that can process a plurality of packets, e.g., 32 packets, at the same time. The RSP 26 scans packets which have been written into packet memory 30 by the PDM 22. The RSP 26 is latency insensitive; that is, if the RSP 26 is delayed for one or more clock cycles it will not lose data or instructions for packet processing. For example, if the RSP 26 wants to write a packet into packet memory 30 at the same time that the PDM 22 wants to write a packet into packet memory 30, the PDM 22 will be given priority. The write operation by the RSP 26 is delayed since it is more capable of absorbing the latency without incurring failures. The RSP 26 will wait until the next clock cycle and attempt its write again, i.e. through re-arbitration.

A packet memory controller (PMC) 24 is used to control and address memory locations, via address lines 25a, and control lines 25b, for packet memory 30. Packet memory 30 is comprised of two memory banks 30a, 30b. The PMC 24 enforces an arbitration process responsible for ordering of the packets for processing by the RSP 26.

Two banks of memory 30a, 30b are provided in system 20. Packets are stored in packet memory 30 in a sequential manner, so that each new packet is written into memory at a point where the previous packet ended. As frames are written into the packet memory 30 by the PDM 22, data is interleaved between the two banks 30a, 30b based on an even/odd order of data arrival (for example, the first write is directed to the even memory bank, the second into the odd memory bank, the third into even memory bank and so on). This interleaving is accomplished by manipulating the memory address lines and steering the data into the correct bank 30a, 30b via the bus exchangers (or multiplexers) 34, 36. In an implementation 2×2 multiplexers can be used. When one bank is being written to, the other bank is free to be written to by another device. This interleaving scheme, when combined with the previously mentioned arbitration operation (i.e., where the latency insensitive device always loses arbitration when arbitrating against a latency sensitive device), effectively doubles the memory bandwidth of a conventional system. A similar interleaving scheme is used for the read cycles of devices.

Each odd and even memory bank 30a, 30b is connected to the PMC 24 by address and control lines 25a, 25b. The address lines 25a are used to communicate the correct memory locations for data for both the read and write cycles. The control lines 25b are used to transmit the correct control signals for packet processing and addressing. The address and control lines 25a, 25b for the packet memory 30 are sourced by the PMC 24 directly. As stated above, the PDM 22 relies on the PMC 24 for proper addressing, while the RSP 26 generates its own addresses.

A packet handler called a Fabric Ingress Direct Memory Access (FI-DMA) device 38 is connected to the RSP 26 and the even and odd memory banks 30a, 30b. The FI-DMA device 38 is responsible for taking a packet from the memory banks 30a, 30b processing the headers in the packets and feeding the packets to Fabric Ingress (FI) Chips (not shown). The FI chips control the ingress of packet traffic into the fabric. "Fabric" or "Switching Fabric" refers to the interconnection mechanism between packet processors that allows data to be sent from one processor to another. A fabric ingress (FI) chip is an interface and protocol controller that enables a packet processor to access the input-side (ingress) of the switching fabric. A fabric output (FO) chip is an interface and protocol controller that enables a packet processor to access the output-side of the switching fabric.

It is noted that other embodiments are not limited to the implementation as discussed above.

Figure 3:
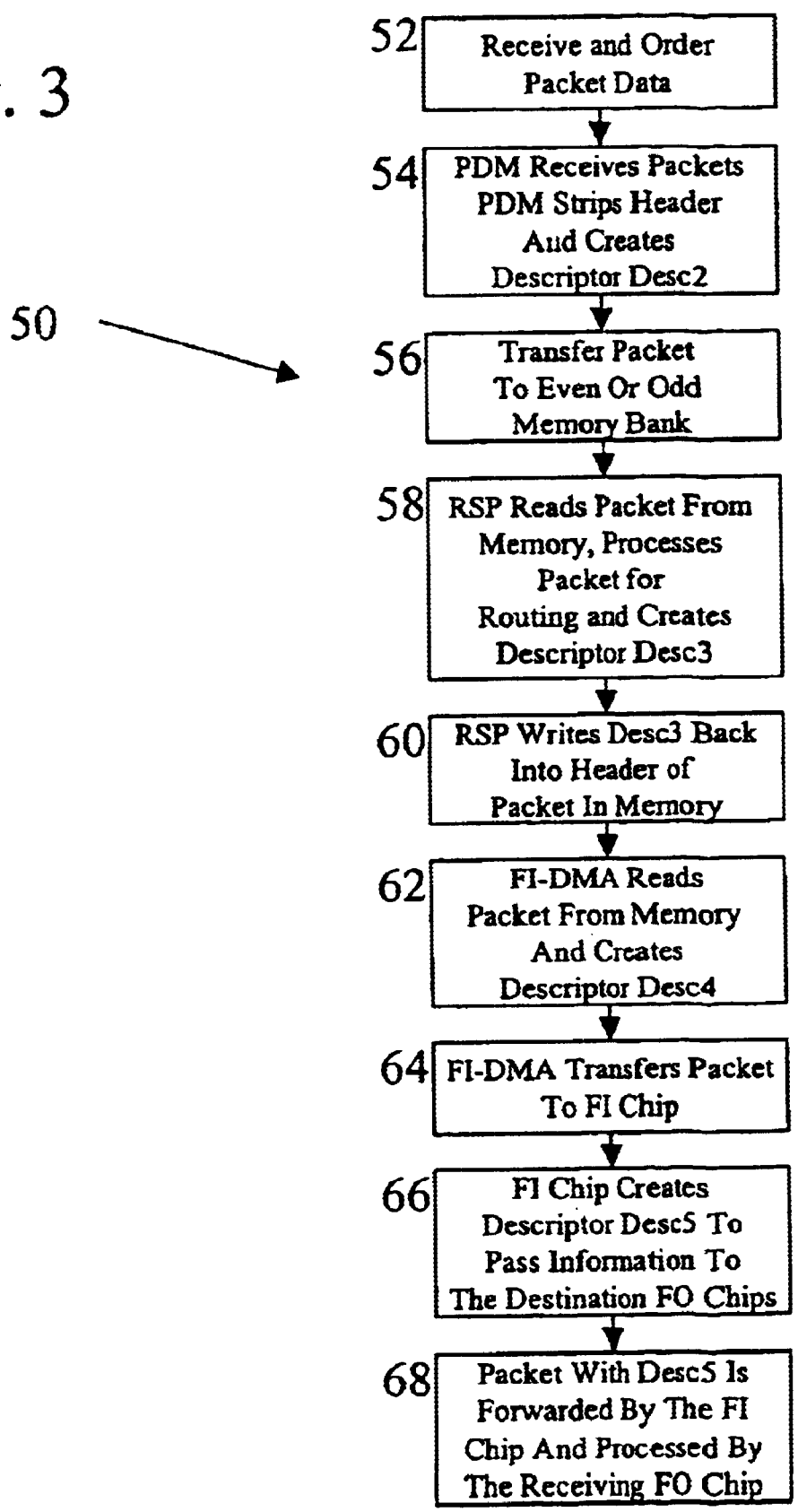
FIG. 3 illustrates a flow chart of an implementation of packet processing.

Referring to FIG. 3, packet processing 50 in the system 20 is shown. Packets are received by the POS framer and ordered for processing 52. The PDM 22 receives 54 the packets from the framer and strips the PPP header and builds a 32-bit descriptor (Desc2) that is used by the RSP 26 in the packet processing. In other words, Desc2 is a tag the RSP 26 uses to expedite processing. The PDM 22 prepends Desc2 to the packet and transfers 56 the packet into one of the even or odd memory banks. The PDM 22 notifies the RSP 26 that the packet is ready for processing.

The RSP 26 constantly polls the memory to see if there are packets for processing. Once the RSP 26 finds a packet, it performs 58 a cache-line read of 32 bytes from the packet memory 30 to receive Desc2 and information about the Internet Protocol (IP) header. The RSP 26 interprets Desc2 to perform a series of lookups and to process the packet. The RSP 26 creates a new descriptor Desc3 that contains routing information to route the packet to outgoing interfaces. The RSP 26 also includes an "action tag" (Atag) in Desc3 that identifies a port and encapsulation context for the outgoing packet. The RSP 26 writes Desc3 back into the header of the packet in memory 60.

The FI-DMA device 38 reads the packet from packet memory 30, merges Desc3 with the original packet in memory to produce 62 a new descriptor Desc4. The FI-DMA device 38 transfers 64 the Packet with the new header Desc4 to the FI chip. The descriptor information is used by the fabric to transport the packets to the respective fabric output (FO) ports.

The FI chip produces 66 a descriptor Desc5 in order to pass control and context information to the destination FO chips. Desc5 is a subset or limited portion of Desc4 and is extracted from Desc4 by the FI chip. The packet with Desc5 is forwarded by the FI chip and is processed by the receiving FO chip 68.

Packet Memory Arbitration

With respect to the apparatus in FIG. 2 and the packet processing in FIG. 3, reads and writes into the memory banks are performed in an interleaved fashion. The PDM 22 and RSP 26 write data into the packet memory 30, while the FI-DMA device 38 and RSP 26 read data from the memory. Alternate accesses to packet memory 30 are directed towards the other bank, that is, when one bank is being written to or read from, the other bank is available for a write or read. Arbitration for packet memory 30 is required to resolve conflicts that can occur between the PDM 22 and RSP 26 during write cycles, and the FI-DMA device 38 and RSP 26 during read cycles. Both the PDM 22 and FI-DMA device 38 rely on the PMC 24 to generate the correct address. In order to properly arbitrate between the RSP 26 and the PDM/FI-DMA device 38, the RSP's address lines are input into the PMC 24. The PMC 24 outputs the correct address based on the RSP 26 address and the internally maintained PDM/FI-DMA device 38 addresses. The PMC 24 includes a arbitration agent which contains the arbitration process. The arbitration agent can be implemented in digital circuitry, or in computer hardware, firmware, software or in combinations of them.

For write cycles, when a frame is being written into packet memory 30 by the PDM 22, the order for access is even-odd-even-odd . . . etc, based solely on the address (that is, even addresses are written to the even bank and odd addresses are written to the odd bank). Therefore, while the PDM 22 is accessing one bank, the other bank is available for the RSP 26 to write into it. As a simple example, when the PDM 22 is writing into an even address (bank), the RSP 26 is free to write into an odd address (bank). The PMC 24 takes advantage of this situation by allowing the competing PDM 22 and RSP 26 devices to simultaneously access the packet memory 30. A conflict arises when the RSP 26 and its competing device, the PDM 22, both attempt to access the same bank of memory at the same time for a write cycle. A similar conflict arises when the RSP 26 and the FI-DMA device 38 both attempt to access the same bank of memory at the same time for a read cycle.

Thus, the following method for packet arbitration is used. According to the method, the RSP 26 (i.e., the latency insensitive device) always loses out to the other device for access to the packet memory 30.

Figure 4:
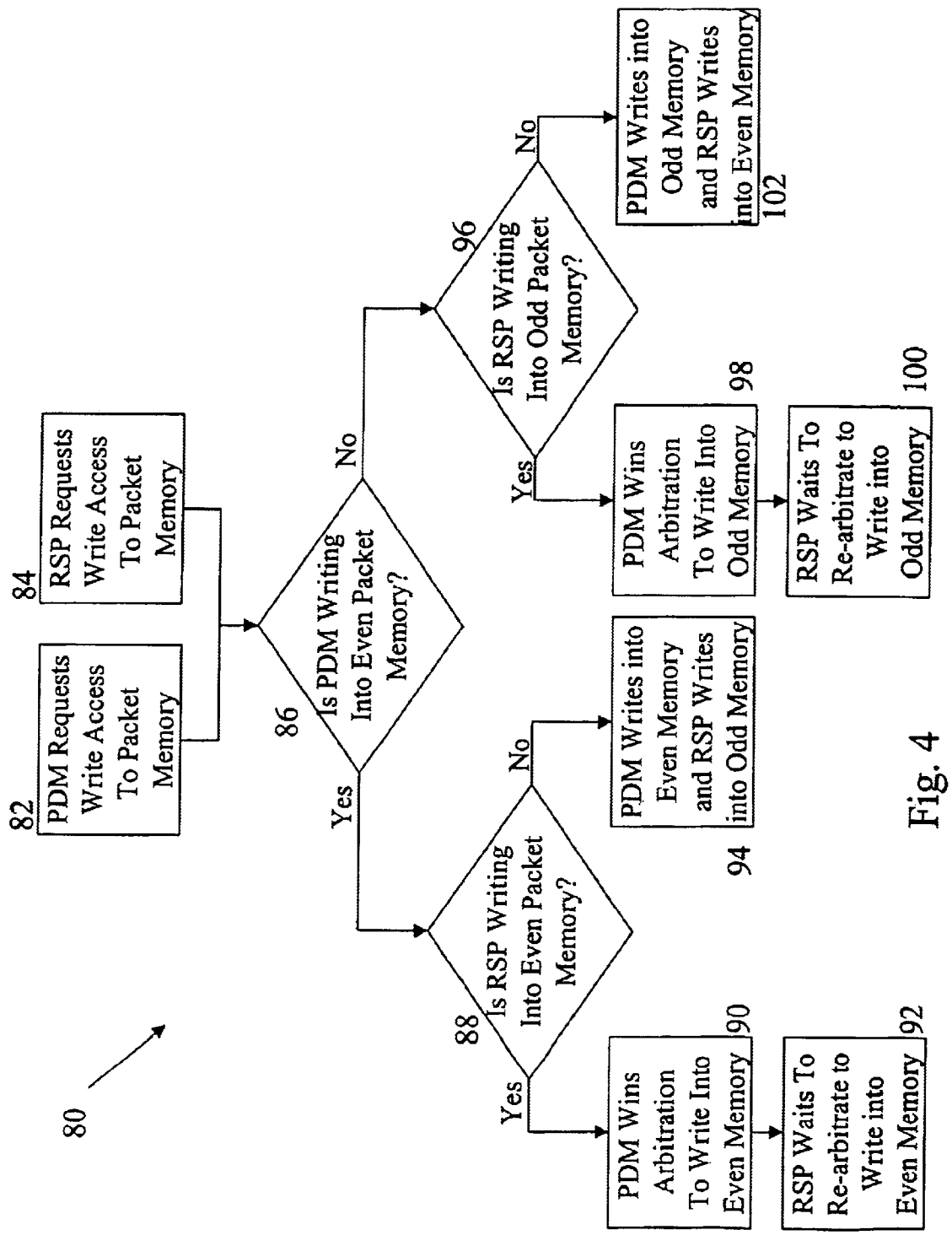
FIG. 4 illustrates a flow chart of an implementation of an algorithm for arbitrating write cycles between two devices.

Referring to FIG. 4, an implementation of memory packet arbitration process 80 for write cycles is shown. After the packet data manager prepares a packet for processing, the PDM 22 requests 82 write access to packet memory 30. Similarly, after the RSP 26 processes a packet it will request 84 write access to packet memory 30. The process 80 determines 86 whether the PDM 22 wants to write the packet into the even memory bank. If the PDM 22 requests write access to the even memory bank, the process 80 determines 88 whether the RSP 26 is also requesting write access to the even memory bank. If the RSP 26 is requesting write access, then the PDM 22 wins arbitration and writes 90 into the even memory bank and the RSP 26 re-arbitrates. The effect of the re-arbitration can be a delay of one clock cycle 92. The RSP 26 then performs its write-into the even memory bank. If process 80 determines 88 that the RSP 26 was writing into the odd memory bank, then there is no write cycle conflict, and the PDM 22 writes into the even memory bank while the RSP 26 writes into the odd memory bank 94.

The process 80 is mirrored if it determines that the PDM 22 is not requesting write access into the even memory bank, [e.g., it is writing into the odd memory bank]. It is determined whether the RSP 26 is requesting write access into the odd memory bank 96. If the process 80 determines the RSP 26 is requesting write access then the PDM 22 wins the arbitration to write into the odd memory bank 98. In other words, the latency insensitive device (the RSP 26) loses arbitration to the latency sensitive device (the PDM 22). The RSP 26 then re-arbitrates and upon winning arbitration, writes into the odd memory bank 100. If however, the RSP 26 is not writing into the odd memory bank 96 and, therefore it is writing into the even memory bank, then there is no write cycle conflict, and the PDM 22 writes into the odd memory bank, and the RSP 26 writes into the even memory bank 102.

Figure 5:
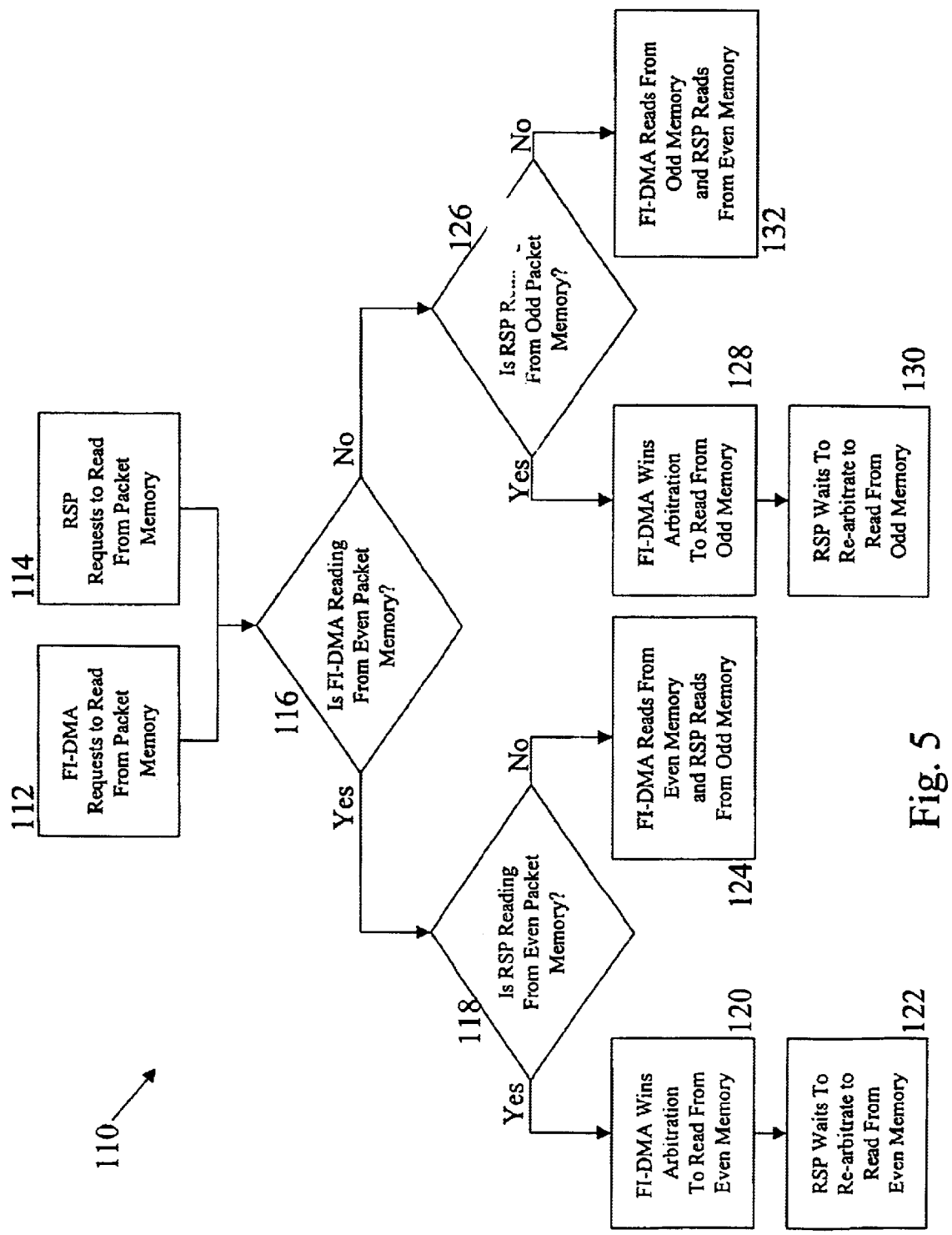
FIG. 5 illustrates a flow chart of an implementation of an algorithm for arbitrating read cycles between two devices.

The same algorithm is used for read cycle conflicts between the FI-DMA device 38 and RSP 26. Referring to FIG. 5, an implementation of memory packet arbitration process 110 for read cycles is shown. After FI-DMA device 38 receives a message that a packet is ready to be read from memory for routing to a FI chip, the FI-DMA device 38 requests read access to packet memory 30 at 112. When a packet is prepared for processing, the FI-DMA device 38 requests read access to packet memory 30 at 114. The process 110 determines 116 whether the FI-DMA device 38 is requesting a read for the packet from the even memory bank. If the FI-DMA device 38 requests read access to the even memory bank, the process 110 determines whether the RSP 26 is also requesting read access from the even memory bank 118. If the RSP 26 is requesting read access, the FI-DMA device 38 wins arbitration and reads from the even memory bank 120. The RSP 26 is chosen to lose arbitration because it is latency insensitive. The RSP 26 re-arbitrates until it is not competing with a latency sensitive device for access to the same bank. The RSP 26 then performs its read from the even memory bank 122. If process 110 determines 118 that the RSP 26 was reading from the odd memory bank, then there is no read cycle conflict, and the FI-DMA device 38 reads from the even memory bank and the RSP 26 reads from the odd memory bank 124.

The process 110 is different if it determines that the FI-DMA device 38 is not reading from the even memory bank, e.g., it is reading from the odd memory bank. It is determined whether the RSP 26 is requesting read access for the odd memory bank 126. If the process 110 determines the RSP 26 is requesting read access then the FI-DMA device 38 wins the arbitration to read from the odd memory bank 128. The RSP 26 re-arbitrates and upon winning arbitration writes from the odd memory bank 130. If however, the RSP 26 is not reading from the odd memory bank 126 and, therefore is reading from the even memory bank, then there is no conflict, and the FI-DMA device 38 reads from the odd memory bank, and the RSP 26 reads from the even memory bank 132.

Therefore, when the PDM 22 runs through a write cycle, and the destination bank collides with the destination bank of the RSP 26 write cycle, or the FI-DMA device 38 runs through a read cycle and the destination bank collides with the destination bank of the RSP 26 read cycle, the RSP 26 is "stuttered", or delayed until it wins arbitration. The RSP 26 will win arbitration when it is not in conflict with a latency sensitive device. The goal is to align the accesses of the two devices so that they are always accessing different banks. With this accomplished both devices see full-rate access to packet memory 30 thereby effectively doubling the throughput over a single bank memory architecture. The key to the simplicity of the algorithm lies in the fact that the RSP 26 is latency-insensitive. The RSP 26 can tolerate latencies on the order of one or more clock cycles. Therefore, if there is a write or read conflict and the RSP 26 is delayed one or more clock cycles, the RSP 26 will not lose data or instructions for its read or write.

Two dual port memory structures are used as the basis for the packet memory banks 30a, 30b. In one implementation, Motorola MCM69D536 "32K×36 bit Synchronous Dual I/O, Dual Address SRAMs" are used as the basis for the packet memory 30. It is understood that other memory structures may be used for the memory banks 30a, 30b. The interleaved packet memory architectures typically include a packet memory throughput of approximately 5.8 Gbps which is referred to as the "line-rate" of a typical network system. This line-rate is broken down approximately evenly between reads and writes. Therefore, each of the read and write operations perform at a rate of approximately 2.9 Gbps.

In an implementation where the Dual Port Memory structures run at a clock speed of 83 Mhz each and the RSP 26 runs at 66 MHz, the Dual port memory structures typically run at the 66 MHz bus access frequency. Therefore at least one port of the RAM typically operates at 66 MHz.

In another embodiment, the apparatus and methods described above can be used to perform generic data reads and writes and is not limited to network data packets.

In a further embodiment, the apparatus and methods as described above can be used to read and write commands and instructions into memory.

It will be recognized by one of ordinary skill in the art that the present invention can be extended to a computer system wherein more than two memory banks provide storage for packets processed or accessed by a combination of latency insensitive and latency sensitive devices such as the PDM 22 and the RSP 26. For example, rather than having packet data written to even and odd memory banks as described above, an allocation routine such as a round robin routine or least recently used algorithm can select one memory bank from the group of memory banks into which the packet data can be stored. Accordingly, such a configuration could reduce the possibility that the PDM 22 and the RSP 26 would concurrently request access to the same bank. However, when concurrent access to the same memory bank is requested, the PDM 22 (i.e. the latency sensitive device) will be allowed to win arbitration and access the data while the RSP 26 (i.e. the latency insensitive device) is forced to re-arbitrate. In other words, the latency insensitive device's access to the memory bank is delayed or stuttered, since it will typically, but not necessarily, win arbitration on the next clock cycle.

The invention is not limited to the specific hardware and software configurations described herein. In this regard, it is to be understood that while the invention has been described in conjunction with the detailed description thereof, the foregoing description is intended to illustrate, and not to limit, the scope of the invention. Other aspects, advantages, and modifications are within the scope of the following claims.

What is claimed is:

1. An apparatus for storing network packets, comprising:
   a latency sensitive packet handler for receiving network packets;
   a packet memory structure including a first memory bank and a second memory bank to store network packets;
   a latency insensitive packet processor connected to the first and second memory banks; and
   a memory controller connected to the memory banks and to the packet handler, said memory controller including an arbitration agent which delays the packet processor from accessing one of the memory banks when the packet processor is in a conflict for the same one of the memory banks with the packet handler.

2. The apparatus of claim 1 wherein the arbitration agent does not delay the packet processor from accessing one of the first and second memory banks when the packet processor is not in conflict for the same one of the first and second banks with the packet handler.

3. The apparatus of claim 1 wherein the first and second memory banks are dual ported memories.

4. The apparatus of claim 1 wherein one of the first and second memory banks receives even memory addresses, and the other of the first and second memory banks receives odd memory addresses.

5. The apparatus of claim 1 further comprising a second latency sensitive packet handler for writing out processed packets.

6. The apparatus of claim 5, wherein the second packet manager is a direct memory access device.

7. The apparatus of claim 6 wherein the arbitration agent delays the packet processor from accessing the memory banks to when the packet processor is in a conflict for the same one of the first and second banks with the second packet handler.

8. The apparatus of claim 7 wherein the arbitration agent does not delay the packet processor from accessing one of the first and second memory banks when the packet processor is not in conflict for the same one of the first and second banks with the packet handler.

9. The apparatus of claim 1 wherein the packet processor is a multi-threaded microcontroller.

10. The apparatus of claim 1 further comprising a storage device for storing packets for processing by the packet processor.

11. The apparatus of claim 10 wherein the storage device is a FIFO.

12. The apparatus of claim 1 further comprising:
    at least one additional memory bank connected to the memory controller, wherein all of said memory banks can be written to and read from by the packet handler and the packet processor.

13. An apparatus for storing packets in memory for processing and routing, comprising:
    means for receiving a plurality of packets having a first descriptor;
    means for preparing the packets for processing and routing;
    means for writing individual of the plurality of packets alternately into a first memory structure, and a second memory structure;
    means for alternately reading individual packets from the first memory structure and the second memory structure;
    means for processing the plurality of packets for routing;
    means for writing individual of the plurality of packets alternately into the first memory structure, and the second memory structure;
    means for alternately reading individual packets from the first memory structure and the second memory structure; and
    means for routing the plurality of packets to a plurality of destinations.

14. The apparatus of claim 13 wherein the means for receiving a plurality of packets comprises a packet over SONET framer.

15. The apparatus of claim 13 wherein means for preparing the packets for processing and routing comprises:
    means for classifying the packets; and
    means for creating a second descriptor.

16. The apparatus of claim 13 wherein means for processing the packets for routing comprises:
    means for creating a second descriptor having information relating to a plurality of destinations for the plurality of packets.

17. The apparatus of claim 13 wherein means for routing the plurality of packets to a plurality of destinations comprises:
    means for transferring the plurality of packets to a fabric ingress chip.

18. A method for storing packets in memory for processing and routing, comprising:
    receiving a plurality of packets having a first descriptor;
    preparing the packets for processing and routing;
    writing individual of the plurality of packets alternately into a first memory structure, and a second memory structure;
    alternately reading individual packets from the first memory structure and the second memory structure;

processing the plurality of packets for routing;

writing individual of the plurality of packets alternately into the first memory structure, and the second memory structure;

alternately reading individual packets from the first memory structure and the second memory structure; and routing the plurality of packets to a plurality of destinations.

19. The method of claim 18 wherein receiving a plurality of packets comprises using a packet over SONET framer.

20. The method of claim 18 wherein preparing the packets for processing and routing comprises classifying the packets and creating a second descriptor.

21. The method of claim 18 wherein processing the packets for routing comprises creating a second descriptor having information relating to a plurality of destinations for the plurality of packets.

22. The method of claim 18 wherein routing the plurality of packets to a plurality of destinations comprises transferring the plurality of packets to a fabric ingress chip.

23. A method for arbitrating reads of packets into memory, comprising:

providing a memory system having a first packet handler, a packet processor, a second packet handler, a packet memory connected to the first and second packet handlers and to the packet processor, and a memory controller connected to the packet memory and to the first and second packet handlers;

performing a plurality of reads with the packet processor from a plurality of memory locations in the packet memory;

performing a plurality of reads with the second packet manager from the plurality of packet memory locations in the packet memory; and delaying any one of the plurality of reads performed by the packet processor when the any one of the plurality reads performed by the packet processor is to a common memory location of any one of the plurality of reads performed by the second packet manager.

24. The method of claim 23 further comprising:

completing the any one of the plurality of reads by the packet processor after delaying any one of the plurality of reads.

25. A method for arbitrating writes of packets into memory, comprising:

providing a memory system having a first packet handler, a packet processor, a second packet handler, a packet memory connected to the first and second packet handlers and to the packet processor, and a memory controller connected to the packet memory and to the first and second packet handlers;

performing a plurality of writes using the packet processor to a plurality of memory locations in the packet memory;

performing a plurality of writes using the first package handler into the plurality of packet memory locations in the packet memory; and delaying any one of the plurality of writes performed by the packet processor when the any one of the plurality of writes performed by the packet processor is to a common memory location of any one of the plurality of writes performed by the first packet handler.

26. The method of claim 24 further comprising:

completing the any one of the plurality of writes by the packet processor after delaying any one of the plurality of writes.

27. A method for arbitrating reads and writes of packets into memory, comprising:

providing a memory system having a first packet handler, a packet processor, a second packet handler, a packet memory connected to the first and second packet handlers and to the packet processor, and a memory controller connected to the packet memory and to the first and second packet handlers;

performing a plurality of writes using the packet processor to a first plurality of memory locations in the packet memory;

performing a plurality of reads using the packet processor from a second plurality of memory locations in the packet memory;

performing a plurality of writes using the first packet handler into the first plurality of packet memory locations in the packet memory;

performing a plurality of reads using the second packet handler from the second plurality of packet memory locations in the packet memory;

delaying any one of the plurality of writes performed by the packet processor when the any one of the plurality of writes performed by the packet processor is to a common memory location of any one of the plurality of writes performed by the first packet handler;

delaying any one of the plurality of reads performed by the packet processor when the any one of the plurality reads performed by the packet processor is to a common memory location of any one of the plurality of reads performed by the second packet handler;

completing the any one of the plurality of writes by the packet processor after delaying any one of the plurality of writes; and completing the any one of the plurality of reads by the packet processor after delaying any one of the plurality of reads.

* * * * *